F. J. HUEBER & T. J. HAMILTON.
CIRCULAR SAWING MACHINE.
No. 182,929. Patented Oct. 3, 1876.
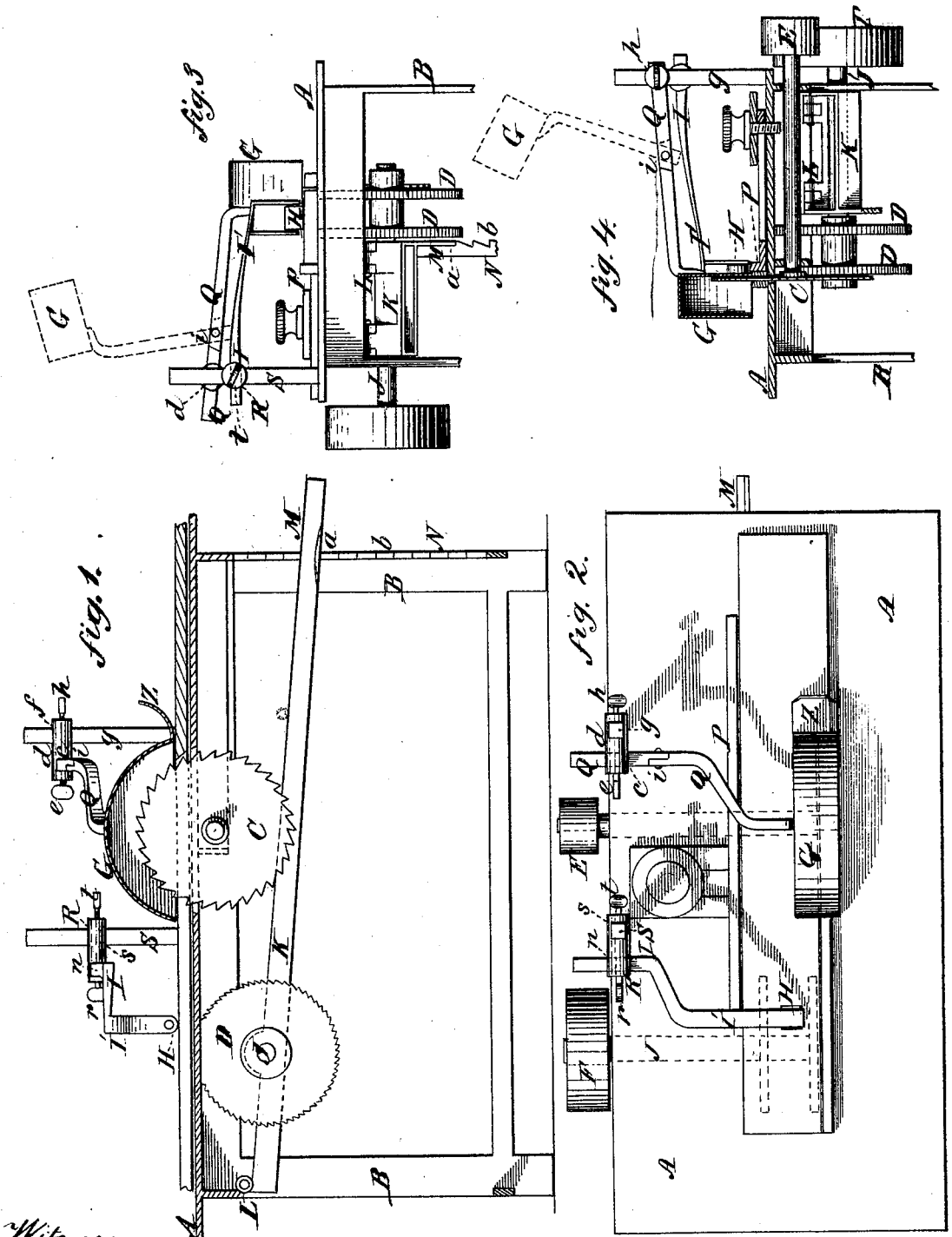

UNITED STATES PATENT OFFICE.

FRANCIES JOSEPH HUEBER AND THOMAS JAMES HAMILTON, OF INDIANAPOLIS, INDIANA.

IMPROVEMENT IN CIRCULAR SAWING MACHINES.

Specification forming part of Letters Patent No. 182,929, dated October 3, 1876; application filed June 17, 1876.

*To all whom it may concern:*

Be it known that we, FRANCIES JOSEPH HUEBER and THOMAS JAMES HAMILTON, of Indianapolis, in the county of Marion and State of Indiana, have invented certain new and useful Improvements in Circular Sawing Machines, of which the following is a specification:

Our improvements relate particularly to the feed device, the saw-hood, and the pressure-roll of a circular sawing machine. Of these the feed device is made adjustable for the work, whereby to obtain different degrees of feeding-hold upon the timber being sawed, and to drop the feed-roll beneath the table when desired to feed by hand, which is important in light work, while in heavy work a greater projection of the feed-rolls above the surface of the table gives a more uniform feed.

In connection with the adjustable table-gage, the saw-hood has an adjustment laterally in relation to the saw, to allow the hood to be set up close to the side of the saw, so as to be out of the way of the gage in sawing narrower stuff. It is important also that the pressure-roll be kept as near the middle of the stuff as possible, whatever may be its width; and for this purpose it is made adjustable horizontally, so as to be out of the way of the gage as it is moved up to the saw as the stuff becomes narrow. These adjustments of the saw-hood and pressure-roll, therefore, co-operate with the adjustment of the gage and of the feed-rolls in giving the advantages stated. The feed-roll is carried in a lever-frame pivoted beneath the table, and made adjustable by a spring-arm and rack, so that the roll may be raised above the surface of the table to varying heights, and depressed entirely beneath it. The saw-hood is mounted by means of a double-slotted bracket upon a standard at one side of the table, and within one of the slots the arm of the hood can be adjusted horizontally in connection with the adjustment of the table-gage. A similar double-slotted bracket supports the pressure-roll for the stuff, and has a similar adjustment as the hood-arm for the purpose stated. The saw-hood is provided with an upwardly-curved lip, whereby to prevent the stuff from striking it in being passed beneath it to the saw, and to keep the sawdust from being thrown upward into the operator's face. The hood-arm is jointed by a knuckle-joint, which allows the hood to be readily turned and held up, and keeps it from resting upon the stuff when over the saw. The pressure-roll is carried by a spring-arm, so as to allow of and co-operate with the adjustment of the feed-roll.

In the accompanying drawings, Figure 1 represents a vertical section of so much of a circular sawing machine as embraces my invention; Fig. 2, a top view of the same; Fig. 3, an end view, showing the spring-arm of the pressure-roll; and Fig. 4, a section showing the jointed hood-arm in position over the saw, and, by dotted lines, turned up and supported by its jointed arm.

The table A, frame B, saw C, and feed roll or rolls D may be of any approved construction. The saw and feed-rolls are driven by belting passing round pulleys E F on their shafts, the pulley on the feed-roll shaft being considerably larger than the saw-pulley to give the proper speed to the feed-rolls. The hood G for the saw and the feed and pressure rolls D and H for the stuff have been used before in circular sawing machines, and the hood has been pivoted so as to be turned up and also made adjustable vertically, while the pressure-roll has also been made adjustable vertically; but these devices have, by our improvements, certain peculiarities in construction and adaptation to render them more advantageous in their functions, which we will now describe.

The feed-rolls D may have smoothed or toothed surfaces, and they project through mortises in the table in the usual manner to take hold of and feed the stuff as it leaves the saw. They are arranged upon the inner end of a shaft, J, which is mounted in a forked lever-frame, K, pivoted at one end beneath the table at L, and provided with a spring-arm, M, extending frontward to the other end of the table, and fitted with a tooth, $a$, to engage into the ratchet-teeth $b$ of a vertical rack-bar, N, for the purpose of allowing the feed-rolls to be raised and lowered, to bring their biting-surfaces more or less above the surface of the table to suit the character of the stuff being sawed, or to depress them wholly beneath the table, when it is desired to feed by hand, as is often done in planed stuff. This adjustment of the feed-rolls, therefore, gives important advantages not enhanced by the fixed rolls heretofore employed.

In this adjustment of the lever-frame the driving-pulley of the feed-rolls moves with them. The table is provided with the usual gage P for adjusting the stuff to the saw.

The hood G covers the saw and protects it and the operator from injury. It is supported just free of the top of the stuff by a horizontal arm, Q, which passes through a slot, c, in a bracket, d, and is clamped by a screw, e, by which means the hood is set close to the side of the saw when the stuff is so narrow that the gage P could not be set up without striking against the hood, or having the hood high enough above the stuff to avoid this contact. But as it is desirable to have the hood as near the surface of the stuff as possible, its horizontal adjustment away from the gage and near the side of the saw is necessary to bring up and hold narrow stuff to the saw. The bracket d is fitted by a slot, f, upon the standard g, and clamped by a screw, h, by which the hood is raised and lowered to suit the thickness of the lumber. By this means the hood may be adjusted both vertically and horizontally, and to allow it to be turned up from over the saw, its supporting-arm Q has a knuckle-joint, i, near the bracket. The function of the knuckle-joint is to sustain the hood free from the stuff, and so that it can be raised at any time, and supported in its raised position by the shoulders of the knuckle-joint, as shown in Fig. 4, and thus avoid the necessity of having to hold it up by hand when so raised, or detaching any of the parts. The hood is provided with an upwardly-curved lip, z, at its end fronting the feed of the stuff, and allows the stuff to pass freely under it to the saw without striking and being arrested by the hood. This lip also keeps the sawdust from flying up and annoying the operator.

The pressure-roll H for the stuff is carried by a horizontal spring-arm, I I', which passes through a slot, n, in a bracket, R, and is clamped by a screw, r, so that the roll can be set to bring the pressure upon the center of the stuff without regard to its width, and to keep it out of the way of the gage, which must be adjusted to suit the work. The bracket R is secured by a slot, s, upon a standard, S, and clamped by a screw, t, by which the bracket can be raised and lowered to cause the roll H to bear with more or less pressure upon the stuff. It is, however, necessary that this pressure should be yielding, and for this purpose that portion of the arm which carries the roll H is spring-plate I', and is arranged in line above the axis of the feed-rolls, so as to yield to any inequalities in the stuff, while at the same time giving the roll a fixed adjustment both horizontally and vertically. The spring function of the pressure-roll is also necessary to co-operate with the adjustable capacity of the feed-rolls.

We claim—

1. The combination, with the saw-hood G and its supporting-arm Q, of the double-slotted bracket d, clamp-screws e h, and standard g, substantially as and for the purpose herein set forth.

2. The hood-supporting arm Q, provided with the knuckle-joint i, for the purpose described.

3. The combination, with the adjustable gage P and the circular saw, of the horizontally-adjustable saw-hood G, for the purpose described.

4. The combination, with the adjustable rolls D and driving-pulley F, of the lever-frame K M, pivoted as described, and the ratchet-holding bar N, substantially as and for the purpose herein set forth.

5. The spring-carrying arm I I' for the feed-roll H, in combination with the double-slotted bracket R, the clamp-screws r t, and the standard S, substantially as and for the purpose herein set forth.

In testimony whereof we have affixed our signatures in the presence of two witnesses.

FRANCIES JOSEPH HUEBER.
THOMAS JAMES HAMILTON.

Witnesses:
T. B. SIMN,
D. W. WEST.